United States Patent [19]

Priola et al.

[11] Patent Number: 4,544,725
[45] Date of Patent: Oct. 1, 1985

[54] COMPOSITION BASED ON ALIPHATIC POLYCARBONATES WHICH CONTAIN URETHAN GROUPS AND ACRYLIC OR METACRYLIC END GROUPS, TO BE CROSS-LINKED IN THE PRESENCE OF RADICALIC INITIATORS

[75] Inventors: Aldo Priola, S. Donato Milanese; Ugo Romano, Vimercate; Fiorenzo Renzi, Gorgonzola, all of Italy

[73] Assignee: Anic S.p.A., Milan, Italy

[21] Appl. No.: 484,954

[22] Filed: Apr. 14, 1983

[30] Foreign Application Priority Data

Apr. 15, 1982 [IT] Italy ................................ 20749 A/82

[51] Int. Cl.$^4$ ..................... C08F 126/02; C08F 226/02
[52] U.S. Cl. ..................... 526/301; 525/467; 528/370
[58] Field of Search .................. 526/301; 525/467; 252/182; 528/370, 468

[56] References Cited

U.S. PATENT DOCUMENTS

| | | | |
|---|---|---|---|
| 3,450,793 | 6/1969 | Schnell | 525/467 |
| 3,518,640 | 6/1970 | Caldwell | 525/467 |
| 3,526,572 | 9/1970 | Finelli | 525/467 |
| 4,101,439 | 7/1978 | Russell et al. | 252/182 |
| 4,107,386 | 8/1978 | Gruber et al. | 525/468 |
| 4,199,526 | 4/1980 | Senet et al. | 526/301 |
| 4,255,243 | 3/1981 | Coqueugniot et al. | 525/455 |
| 4,344,798 | 8/1982 | Gaul et al. | 252/182 |
| 4,360,653 | 11/1982 | Stevens et al. | 526/301 |

FOREIGN PATENT DOCUMENTS 872531  10/1981  U.S.S.R. ............... 528/370

Primary Examiner—Joseph L. Schofer
Assistant Examiner—Peter F. Kulkosky
Attorney, Agent, or Firm—Hedman, Gibson, Costigan & Hoare

[57] ABSTRACT

A composition based on aliphatic polycarbonates containing urethan groups and acrylic or metacrylic end groups, to be cross-linked in the presence of radicalic initiators for their functionalization with acrylic or metacrylic groups of a mixture composed of diols, polyols and their oligomeric derivatives terminated by OH groups and containing in their molecule carbonate groups and urethan groups.

15 Claims, No Drawings

COMPOSITION BASED ON ALIPHATIC POLYCARBONATES WHICH CONTAIN URETHAN GROUPS AND ACRYLIC OR METACRYLIC END GROUPS, TO BE CROSS-LINKED IN THE PRESENCE OF RADICALIC INITIATORS

Oligomers are known and widely used in the industrial practice, as deriving from polyethers or polyesters which contain urethan groups and acrylic or metacrylic end groups. They after a radicalic cross-linking originate films having interesting technological properties such as for example the adhesion to several substrates, pliability, resistance to abrasion and to physical and chemical agent. A problem connected with the use of such products is their high viscosity, so that they must be supplemented by diluents or fluidizing agents so as to obtain fluid mixtures in order to enable the various applicative technologies to be adopted.

An improvement under this particular respect is the use of aliphatic polycarbonates which contain urethan groups since it is known that aliphatic polycarbonates exhibit high fluidity properties especially when appropriate glycols (e.g. diethyleneglycol) are present. In addition, the polycarbonates are characterized by a high stability and inertia towards chemical and physical agents, so that they are very suitable for applications in the field of the reactive oligomers.

At any rate it is however necessary, in order that the systems may have the necessary fluidity, to use mixtures with reactive solvents or diluents.

The use of solvents involves serious problems of an economical nature, high consumption of power and problems as to toxicity and environmental pollution. The use of reactive diluents implies economical problems due to the high costs of such products and toxicological problems are often also present.

It is thus essential to have production processes available which permit to obtain products having the aforesaid properties by a direct or versatile procedure so as to be adapted to the requirements of the specific uses.

Having these objectives in view the applicants have envisaged a process for the production of reactive products in the presence of radicalic initiators by synthesizing an intermediate which contains hydroxyl functions and consisting of a mixture of a diol or polyol and their OH-terminated oligomeric derivatives which contain in their molecules carbonate and urethan groups and by subsequently functionalizing same with acrylic or metacrylic groups.

It becomes thus possible to obtain the advantages inherent in the simultaneous presence of carbonate and urethan groups together with a high fluidity of the mixtures so obtained.

It is possible, moreover, by varying the structures of the diols or the polyols used and their functionality, as well as by modifying the ratio of the urethan groups to the carbonate groups which are present, appropriately to vary the technological properties of the cross-links obtained upon polymerization of the mixture, and to modify the reactivity itself in the presence of radicalic initiators.

By so doing, considerable advantages are achieved over the conventional techniques because a single process effects the synthesis of a product having preselected properties as to viscosity and chemical reactivity and it becomes possible to produce, with a single installation, a wide range of products adapted to a number of practical applications. These applications are, among others:

the direct use of these products, cross-linked by radicalic initiators, UV-radiations or electronic radiations, in the painting of paper, wood, plastics materials, leather, fabrics and in the varnishing and insulation of electric wires and cables;

the use of such products in admixture with polyester resins (acryl-substituted or not), epoxy-acrylic resins or urethan acrylic resins for the preparation of laminates and materials admixed with glass fibers and organic fibers;

the use of the products in question for producing materials having extremely good optical properties, such as lenses, transparent slabs and various articles;

the use as adhesives, such as optical cements, for welding together slabs of organic and inorganic glasses.

Quite particular properties of such products are the low viscosity and the high reactivity in radicalic polymerization reactions, and, in addition, they exhibit other interesting properties such as the low volatility, the absence of odors, the low irritating power towards the human skin and the ease of application with the conventional procedures.

The diols or polyols to be employed have a number of carbon atoms comprised between 3 and 20 and can contain in their molecules ether bridges or aromatic or cycloaliphatic groups and a number of hydroxyl functions between 2 and 4.

Nonlimiting examples of these compounds are: 1,4-butanediol, neopentylglycol, diethylene glycol, 1,6-hexanediol, triethyleneglycol, 1,3- and 1,4-dimethanolcyclohexane, 1,3- and 1,4-dimethanolbenzene, $\alpha',\omega$-bishydroxyethyl-bisphenol A, dimethanoltricyclodecane, trimethylolpropane, pentaerythritol, 1,4-butenediol-2, bis-hydroxyethylhydroquinone and others. The polycarbonate intermediate can be obtained by any of the conventionally used methods for preparing carbonic esters and the production steps are:

(1) The reaction of transesterification between the diol, or the polyol, and a dialkyl or diaryl carbonate;
(2) The reaction between the diol or the polyol and alkylcarbonic or arylcarbonic derivative thereof;
(3) The reaction between the diol, or the polyol or a bis-chloroformate derivative thereof;
(4) The reaction between the diol, or the polyol, and phosgene.

The procedures under (1) and (2) above exhibit as compared with the processes which use phosgene or chloroformates an additional advantage because, by employing appropriate mixtures of diol or polyol and carbonic derivative in the polycondensation reactions, final mixtures of diols or polyols and oligocarbonates can be obtained, which can directly be utilized in the subsequent stage of acrylic, or metacrylic, functionalization step.

Moreover, these procedures permit that products may be obtained, having a higher transparency, a less intensive discoloration and a total absence of chlorinated products. By so proceeding the products which are obtained with the procedures (1) and (2) above exhibit improved properties especially for the use in the optical field. In the thus obtained products, the urethan function is introduced by reaction with a primary diamine which brings about the quantitative replacement of a fraction of the carbonate groups by an equivalent quantity of urethan groups.

The reaction is preferably carried out in bulk at temperatures between 40° C. and 120° C.

The diamines which can be employed have the following general formula: H$_2$N—R—NH$_2$ wherein R is an alkylene, aliphatic, cycloaliphatic or aralkyl radical, straight linear or branched and with a number of carbon atoms comprised between 2 and 16.

Examples of diamines which can be used are: 1,3-bis-aminomethylcyclohexane, 1,3- and 1,4-xylylenediamine, hexamethylenediamine, 5-amino-1,3,3-trimethylcyclohexylmethylamine.

The subsequent stage of acrylic functionalization can be carried out by reacting the mixture of diol or polyol with the polyurethanecarbonate oligomer in any of the following ways:

1° reaction with acrylic or metacrylic acid
2° reaction with acrylic or metacrylic esters
3° reaction with the acrylic acid chlorides or the metacrylic acid chlorides.

In the first two cases above one can use with advantage a soluble or insoluble acidic catalyst which accelerate the reaction, and the latter can be further boosted and completed by continually withdrawing the reaction volatiles (water or alcohol), optionally by an azeotropic mixture with a properly selected solvent. The acidic catalysts which can be employed consist of p.toluene sulphonic acid, methanesulfonic acid, trifluoromethanesulfonic acid, anhydrous sulphuric acid, benzenesulphonic acid, polystyrenesulphonic resins.

The solvents which can be employed for the reactions 1° and 2° consist of aliphatic, cycloaliphatic, aromatic or halogenated hydrocarbons, such as: benzene, toluene, xylenes, chlorobenzene. In the third case the reaction with the acid chlorides or the acrylic or metacrylic acids is carried out in the presence of an aliphatic, aromatic or halogenated hydrocarbon solvent and of a tertiary amine in stoichiometric amount relative to the acid chloride at temperatures comprised between 0° C. and +50° C.

Examples of amines which can be employed are: pyridine, triethylamine, tri-nor.butylamine and others.

An alternative procedure for introducing the urethane function in these products consists in diluting the mixture of diols, polyols and their OH-terminated oligomeric derivatives with acrylic esters of diols or polyols and subsequent reaction of same with a diisocyanate having the general formula: O=C=N—R—N=C=O wherein R is an aliphatic alkylene or a cycloaliphatic radical or an aryl radical, optionally also substituted in the measure of two isocyanic groups per one OH group. The products so obtained are subsequently reacted with hydroxyalkylacrylates until the isocyanic groups which are present are all discharged. The reactions are carried out at temperatures comprised between +20° C. and +80° C., in the presence, or not, of quantities, variable from 0.1% to 2% of a catalyst consisting of Sn-dibutyldiacetate, Sn-dilauryldiacetate, benzyldimethylamine. Examples of diisocyanates which can be used are: isophoronediisocyanate, 2,4- and 2,6-toluenediisocyanate, hexamethylenediisocyanate, biphenylmethane-4,4-diisocyanate.

Examples of hydroxyalkylacrylates are: 2-hydroxypropylacrylate, 2-hydroxyethylacrilate, 3-hydroxybutylacrylate and others.

Examples of acrylic acid esters which can be used are: diethyleneglycolacrylate, neopentylglycoldiacrylate, hexanedioldiacrylate, butanedioldiacrylate, trimethylolpropanetriacrylate.

The products obtained as outlined above can be polymerized with any type of radicalic initiator and lead to the formation of insoluble cross-linked products the properties of which vary as a function of the structure and the concentration of the functional acrylic groups present in the reaction mixture.

More particularly, cross-linking can be carried out by irradiating with ultraviolet radiations the mixture in the presence of appropriate photoinitiators to be present in a concentration varying from 1% to 6% on a weight basis. Examples of photoinitiators to be used are: benzyldimethylketal, the benzoin ethers, trichloroacetophenone, 2-hydroxy-2-methyl-1-phenylpropanone-1, thioxanthone, benzophenone together with tertiary amines.

The products obtained according to the present invention are characterized by high polymerization kinetics. As an alternative, cross-linking can be carried out thermally in the presence of typical radicalic initiators, such as benzoyl peroxide, azobisisobutyronitrile, tert.butylperbenzoate, bicyclohexylperoxydicarbonate, diisopropylperoxydicarbonate, or of redox type initiators consisting of the peroxides enumerated above and amines.

The concentration of these initiators may vary between 1% and 5% by weight and the reaction temperatures are in the range between +20° C. and +80° C.

A few examples will now be given relating to the preparation of the products inquestion and their properties just to better illustrate the invention which shall not be construed as being limited thereby.

EXAMPLE 1

A 500 ml Claisen flask having a 6-plate Vigreux column, equipped with a thermometer and a stirring mechanism and with an oil-jacket thermostat has been charged with 94.6 g (grams) (0.80 mol) of 1,6-hexanediol, 42.4 g (0.40 mol) of diethyleneglycol, 90 g (1 mol) of dimethylcarbonate and 216 g of a 30% solution of sodium methylate in methanol. The reaction mixture has gradually been heated at atmospheric pressure and continually distilling off methanol from the system in the form of an azeotrope with dimethylcarbonate. As the bottom temperature reached 130° C. vacuum was gradually applied until reaching 250 mmHg (mm of mercury). This reaction stage last about 2 hours. The system was then maintained under these conditions until distillation was over. Then, vacuum was brought to 10 mmHg to remove the last traces of volatiles. The reaction was completed in 5 hours. There were obtained 72 g of a condensed volatile fraction consisting of methanol (66.2%) and dimethylcarbonate (33.8%). The residue, 155 g, was composed, for its 20% of DEG and hexanediol and the remaining fraction was oligocarbonates of the two diols and contained 10.1% of free —OH groups.

The product thus obtained was reacted in the same apparatus with 34 g (0.24 mol) of 1,3-bis(aminomethyl)-cyclohexane.

The reaction mixture was gradually heated to 120° C. and held at this temperature for a time of 7 hours.

On completion of such a step the amine was thoroughly converted and the product showed but a slight basic reaction which was discharged by percolation on an acidic Amberlyst-15 resin.

The free hydroxyls in the mixture were 10.9%. The product obtained in this way has been supplemented with free diethyleneglycol and subjected to acrylation according to the following procedure.

A 500 ml flask having a Marcusson header at its top and fitted with a water-cooled reflux condenser had been charged, while working a dry nitrogen atmosphere, with 70 g of the previously obtained mixture, 30 g of free diethyleneglycol, 76 g (1.06 mol) of acrylic acid, 100 mg of phenthiazine and 200 mls of benzene.

In the system, upon heating for a few minutes under reflux conditions, there was introduced 1.5 g of p.toluenesulphonic acid and heating was continued under reflux conditions for a time of 12 hours. The water as formed during progress of the reaction was collected and separated in the Marcusson header, in which there were measured 17.8 mls of water as compared with a theoretically predictable volume of 18.3 mls.

The reaction trend, as regards the free diethyleneglycol, has been checked gaschromatographically (a SE 30 column, 10%, length 3 meters, column temperature 170° C.): the analysis have shown the complete absence of free glycol, whereas the ratio of diethyleneglycol diacrylate to the corresponding monoacrylate was 92 to 8 in percentage area terms.

The reaction products have subsequently been treated with 10 g of $K_2CO_3$(solid) stirring at room temperature for 3 hours and filtering then the mixture on a porous $G_2$ diaphragm. Subsequently, the solvent has been evaporated under vacuum in a rotary evaporator working at room temperature and the maximum degree of vacuum was 0.2 Torr.

There were obtained 140 g of end product, corresponding to a yield of 91%. The product had an acid number of 1.5 and a viscosity of 320 centipoises as measured at 25° C. with a Brookfield viscosimeter.

The contents of free hydroxyl end group was 0.3%.

A portion of the product has been supplemented with 3% of its own weight of benzyldimethylketal and spread over sandblasted steel slabs with the aid of a K-control bar. The slabs have then been caused to pass through an UV-producing apparatus consisting of a medium-pressure mercury vapour lamp having a power output of 80 W/cm, equipped with a conveyor belt moved at a speed of 24 m/minute. After 10 passes in total a thoroughly dry film was obtained, having the following properties:

Thickness=45 microns
König Hardness=62 (SM Unichem 91)
Flexibility at impact=60% (FTM 6226)
Adhesion without tape=100% (ASTM D-3002)
Adhesion with tape=80% (ASTM D-3002)
% gel=97%

The same mixture was spread over a support of stiff paper (0.4 mm thick) with the same procedure for application and was cross-linked as specified above and gave a glossy and brilliant film having no thickness and a very good pliability up to a temperature of 180° C.

The most appreciable properties of this product are thus its pliability and a strong adhesion to several substrates.

EXAMPLE 2

A 5000 ml 3-necked flask having a 25-plate (30 mm dia.) distillation column at its top, and equipped with an electromagnetic stirring mechanism and an oil-jacketed thermostat, was charged with 2334 g (22 mol) of diethyleneglycol, 1464 g (12.40 mol) of diethylcarbonate and 20 g of a 10% solution of sodium ethylate. The reaction was carried out at the outset under atmospheric pressure and ethanol was removed continually until the bottom temperature reached 140° C., whereafter vacuum was applied and the pressure was gradually reduced to 100 mmHg (absolute pressure) so as to maintain a bottom temperature of 140° C.

On completion of the reaction, after about 4 hours, the pressure was reduced to 15 mmHg only so as to drive off the last traces of volatile compounds. There were obtained 1200 g of a distillate containing ethanol (87.4%) and diethylcarbonate (12.6%). The bottom product (2590 g) which contained diethyleneglycol (24.6%) and a mixture of oligocarbonates of diethyleneglycol (14.3% of free hydroxyls, —OH) was neutralized with 8 g of glacial acetic acid and then subjected to a further distillation under reduced pressures (2 mmHg at 140° C.) to reduce the quantity of free diethyleneglycol. There were obtained 940 g of a distillate consisting of diethyleneglycol and 1650 g of residue consisting partly of diethyleneglycol (2.3%) and the balance oligocarbonates of diethyleneglycol.

The hydroxyl number (OH) was 5.8%.

86.1 g of the product as obtained from the preparation described above were reacted similarly to what had been illustrated in Example 1, with 15 g of 1,3-bis-aminomethylcyclohexane.

The final product, containing diethyleneglycol and a mixture of polycarbonate and poliurethan of diethyleneglycol together with 1,3-aminomethylcyclohexane, exhibited 7.7% of free hydroxyls (OH).

70 g of the latter product, 30 g of free diethyleneglycol, 66 g of acrylic acid, 100 mg (milligrams) of phenthiazine and 200 mls of benzene had been introduced in the reaction flask with the same procedure as reported in Example 1. The system has then been supplemented with 1.5 g p.toluenesulphonic acid and refluxing has been continued for a time of 12 hours. As a result, there have been collected in the Marcusson header 15.4 mls of water (theory: 16 mls). The gaschromatographic analysis of the reaction product relating to the free diethyleneglycol showed a complete absence of free glycol and the presence of diethyleneglycol diacrylate (or monoacrylate) in the ratio of 94 to 6 in terms of percentage area.

The reaction product has then been treated with 10 g of $K_2CO_3$, filtered and evaporated under vacuum as reported in Example 1. Thus, there have been obtained 123 g of end product with a yield as high as 85%. The product had an acid number of 3 and a viscosity of 460 cps (centipoises) at 25° C. The product, subjected to ultraviolet irradiation cross-linking gave results which were much similar to those of the sample of Example 1.

EXAMPLE 3

The test was conducted in a manner very similar to the previous one using 75 g of the product described in Example 2 and 25 g of 1,3-bis-aminomethylcyclohexane. There were obtained on completion of the preparation 100 g of product containing 9.3% of free hydroxyl (—OH) groups. The product thus obtained has been subjected to an acrylation reaction with the same procedure as in Example 1.

70 g of such a product, 30 g of free diethyleneglycol, 72 g of acrylic acid, 100 mg of hydroquinone methyl ether and 200 mls of benzene have been introduced in the reaction flask. After refluxing for a few minutes, there has been charged 1.5 g of p.toluenesulphonic acid and refluxing has been continued for 12 hours. There have thus been collected in the Marcusson header 16 mls of water (theory: 17 mls). The gaschromatographic analysis of the reaction products relative to the free diethyleneglycol disclosed the complete absence of the free glycol and the presence of diethyleneglycol diacrylate and monoacrylate in the ratio of 95% to 5% in areal terms.

The reaction product has then been treated with 10 g of $K_2CO_3$, filtered and vacuum dried as described in Example 1.

There have been obtained in this way 121 g of end product with a final yield of 82%. The product had an acid number of 0.5 and a viscosity of 380 cps at 25° C. The technological properties of the product upon cross-linking were akin to those of the sample of Example 1.

EXAMPLE 4

87 g of the product described in Example 2 were reacted with 15 g of hexamethylenediamine in a device similar to that of Example 1 but having a volume of 250 mls. Amination was carried out with a procedure similar to that described in Example 1.

On completion of the reaction the amine conversion was total and the product contained only traces of basic amine groups which were removed by elution on an acidic resin (Amberlyst-15).

The product contained 8.4% of free hydroxyls (OH) and consisted of diethyleneglycol and a mixture of polycarbonate polyurethans of diethyleneglycol and hexamethylenediamine. The product thus obtained has been subjected to an acrylation reaction with the same procedure as described in Example 1.

The reaction flask has been charged with 50 g of the product aforementioned, 30 g of diethyleneglycol, 60 g of acrylic acid, 100 mg of phenthiazine and 200 mls of benzene. After heating for a few minutes there has been introduced 1.5 g of p.toluenesulphonic acid and refluxing has been continued for 12 hours.

There have thus been collected in the Marcusson header 13.5 mls of water (theory: 14 mls). The gaschromatographic analysis of the reaction products relative to free diethyleneglycol exhibited the total absence of the glycol and the presence of the diacrylate and the monoacrylate in the areal ratio of 92% to 8%.

The reaction product has then been treated with 10 g of $Na_2CO_3$, filtered and evaporated under vacuum. There have been obtained 97 g of end product with a final yield of 78%.

The product as obtained was semi-solid and was converted, at 50° C., into an extremely viscous liquid.

EXAMPLE 5

An apparatus akin to that described in Example 2 was charged with 1698 g (16 mol) of diethyleneglycol, 1692 g (18.8 mol) of dimethylcarbonate and 14 g of a 30% solution of sodium methylate in methanol.

A distillate fraction was obtained weighing 1280 g consisting of dimethylcarbonate (35.8%) and methanol (64.2%) and a residue of 2124 g consisting of diethyleneglycol (4.8%) and diethyleneglycol polycarbonate with a hydroxyl number of 5.4% free OH radicals.

An apparatus akin to that described in Example 1 was charged with 202 g of product and 50 g of 5-amino-1,3,3-trimethyl-cyclohexylmethylamine. With the same procedure as in Example 4 there were obtained 252 g of a product containing diethyleneglycol and a polycarbonate polyurethan of diethyleneglycol and 5-amino-1,3,3-trimethylcyclohexylmethylamine. The product thus obtained has been subjected to esterification with methacrylic acid with a procedure akin to that of Example 1.

The reaction flask has been charged with 100 g of said product, 30 g of diethyleneglycol, 92 g of metacrylic acid, 100 mg of phenthiazine and 200 mls of toluene. After heating for a few minutes, there have been introduced in the reaction 3 g of p.toluenesulphonic acid and refluxing has been continued for 18 hours. There have been thus collected in the Marcusson header 17.5 mls of water (theory: 18.5 mls). The gaschromatographic analysis of the reaction products relative to free diethyleneglycol disclosed the complete absence of the glycol and the presence of diethyleneglycol dimetacrylate and monometacrylate in the areal ratio of 88% to 12%. The reaction product has been treated with 15 g of $K_2CO_3$, filtered and evaporated under vacuum. There have been obtained 155 g of end product having an acid number of 2.4 and a viscosity of 22 cps at 25° C. The technological properties of the product upon cross-linking were very similar to those of the sample obtained in Example 1.

EXAMPLE 6

In this example and in the following, the synthesis of the urethan-acrylate polycarbonate is carried out by reacting the OH-terminated polycarbonate first with diisocyanate and subsequently with an hydroxyalkylacrylate, operating in the presence of a diol acrylate as the diluent.

A 3-necked 250 ml flask having a stirring device, a charging funnel and a side tube for dry nitrogen intake has been charged with 60 g (0.125 equivalents of —OH groups) of polycarbonate as prepared according to the initial section of Example 2, 30 mls of diethyleneglycol diacrylate and 0.5 g of Sn-dibutyldiacetate.

In the mixture, maintained at a temperature comprised between +50° C. and +60° C. there have been slowly dropped 27.5 mls of isophorone diisocyanate (0.125 mol) and the reaction has been allowed to continue for an overall time of 60 minutes. Thereafter, there have been introduced in the flask 50 mg (milligram) of phenthiazine and 14 mls of hydroxypropylacrylate and the reaction has been continued at 60° C. for 60 minutes. The completeness of the reaction was confirmed by the fading away of the IR-band at 2280 reciprocal centimeters, which is typical of the isocyanic group. The mixture obtained at the end exhibited a viscosity of 480 cps at 25° C. and was employed as such in cross-linking tests as induced by ultraviolet rays as reported in Example 1.

There was obtained a gel contents of 96% and the technological properties were similar to those of the sample of Example 1.

EXAMPLE 7

When operating as described in Example 6 the reaction flask was charged with 60 g (0.125 OH group equivalents) of polycarbonate prepared as in Example 2, 30 mls of butanedioldiacrylate, and, slowly with stirring, 17.5 mls (0.125 mol) of 2,4-toluene diisocyanate, the temperature being maintained in the range from +20° C. to +30° C. The reaction has been continued for one hour, whereafter there have been introduced 50 mg of phenthiazine and 16 mls (0.125 mol) of hydroxypropyl acrylate, the reaction being then continued for one additional hour. The completeness of the reaction has been tested by the disappearance of the IR-band at 2280 reciprocal centimeters, which is typical of the isocyanic group. The final mixture had a viscosity of 540 cps at 25° C. and a behaviour at the UV-cross-linking similar to that of the sample of the previous Example.

We claim:

1. A composition based on aliphatic polycarbonates containing urethane groups and acrylic or methacrylic end groups, capable of being cross-linked in the presence of radicalic initiators for the functionalization with acrylic or methacrylic groups of a mixture composed of diols and their OH-terminated oligomeric derivatives or polyols and their OH-terminated oligomeric derivatives containing in their molecules carbonate groups and urethane groups which composition is prepared by a process comprising the steps of reacting the mixture of diols or and their oligomeric OH-terminated derivatives which contain carbonate groups or polyols and their oligomeric OH-terminated derivatives with contain carbonate groups, in an initial stage with a primary diamine having the general formula: $H_2N—R—NH_2$ wherein the R is an alkylene radical, a straight or branched chain aliphatic, cycloaliphatic or aryl-alkyl radical, having from 2–16 carbon atoms and thereafter functionalizing the OH groups in said mixture with the acrylic or the methacrylic group by reaction with an acrylic or methacrylic acid, ester or acid chloride.

2. Composition according to claim 1 characterized in that the diols and the polyols have a number of carbon atoms comprised between 3 and 20 and can contain in their molecules ether bridges or aromatic or cycloaliphatic groups and a number of hydroxyl functions comprised between 2 and 4.

3. Composition according to claim 1 characterized in that the diol or the polyol is preferably 1,4-butanediol, neopentylglycol, diethylene glycol, 1,6-hexanediol, triethylene glycol, 1,3-dimethanolcyclohexane, 1,4-dimethanolcyclohexane, 1,3-dimethanolbenzene, 1,4-dimethanolbenzene, α-ω-bis-hydroxyethyl-bisphenol A, dimethanol-tricyclo decane, trimethylol propane, pentaerythritol 1,4-butenediol-2, bis-hydroxyethylhydroquinone.

4. Process according to claim 1, characterized in that the reaction with the primary diamine takes place at a temperature comprised between +40° C. and +120° C.

5. Process according to claim 1, characterized in that the diamine is preferably selected from the group comprising 1,3-bis-amino-methylcyclohexane, 1,3- and 1,4-xylylene diamine, hexamethylene diamine, 5-amino-1,3,3-trimethyl-cyclohexylmethylamine.

6. Process according to claim 1, characterized in that the acryl or the metacryl group is introduced by reacting the mixture of diols, polyols and their OH-terminated oligomers containing in their molecules carbonate and urethan groups with acrylic or metacrylic acid.

7. Process according to claim 1, characterized in that the acryl or the metacrylic group is introduced by reacting the mixture of diols, polyols and their OH-terminated oligomers containing in their molecules carbonate groups and urethan groups.

8. Process according to claim 7, characterized in that it takes place in the presence of an acidic catalyst.

9. Process according to claim 8 characterized in that the acidic catalyst is preferably p.toluenesulphonic acid, methanesulphonic acid, trifluoromethanesulphonic acid, anhydrous sulphuric acid, benzenesulphonic acid and the polystyrenesulphonic resins.

10. Process according to claim 7, characterized in that the reaction is carried out within a solvent selected from among the aliphatic, cycloaliphatic, aromatic and halogen-substituted hydrocarbons and mixtures thereof.

11. Process according to claim 1, characterized in that the acrylic or the methacrylic group is introduced by reacting the mixture of diols, polyols and their OH-terminated oligomers containing in their molecules carbonate groups and urethan groups, with the chlorides of the acrylic or the methacrylic acid.

12. Process according to claim 11 characterized in that the reaction is carried out in the presence of a solvent selected from among the aliphatic, aromatic and halogen-substituted hydrocarbons or mixtures thereof.

13. Process according to claim 11, characterized in that it takes place in the presence of a tertiary amine in a stoichiometric amount relative to the acid chloride.

14. Process according to claim 11, characterized in that it takes place at a temperature comprised between 0° C. and +50° C.

15. Process according to claim 1, characterized in that the mixture of diols, polyols and their OH-terminated oligomeric derivatives containing in their molecules carbonate groups is diluted with acryl esters of diols or polyols.

* * * * *